(12) United States Patent
Chen et al.

(10) Patent No.: US 7,197,928 B2
(45) Date of Patent: *Apr. 3, 2007

(54) SOLID-STATE GYROSCOPES AND PLANAR THREE-AXIS INERTIAL MEASUREMENT UNIT

(75) Inventors: Shyu-Mou Chen, Longtan Township, Taoyuan County (TW); Sheau-Shi Tzuoo, Longtan Township, Taoyuan County (TW); Chung-Ta Kau, Longtan Township, Taoyuan County (TW)

(73) Assignee: Chung-Shan Institute of Science and Technology, Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/375,029

(22) Filed: Mar. 15, 2006

(65) Prior Publication Data

US 2006/0156815 A1    Jul. 20, 2006

Related U.S. Application Data

(63) Continuation-in-part of application No. 10/699,868, filed on Nov. 4, 2003, now abandoned.

(51) Int. Cl.
*G01P 9/04* (2006.01)
(52) U.S. Cl. .................. 73/504.04; 73/504.12
(58) Field of Classification Search ............ 73/504.12, 73/504.16, 504.14, 504.02, 504.04
See application file for complete search history.

(56) References Cited

U.S. PATENT DOCUMENTS 5,392,650 A    2/1995  O'Brien et al.
5,753,817 A    5/1998  Park et al.
6,041,653 A    3/2000  Ichikawa et al.
6,504,385 B2   1/2003  Hartwell et al.
6,928,873 B2   8/2005  Chen et al.

*Primary Examiner*—Hezron Williams
*Assistant Examiner*—John C. Hanley
(74) *Attorney, Agent, or Firm*—Birch, Stewart, Kolasch & Birch, LLP

(57) ABSTRACT

The present invention relates to a z-axial solid-state gyroscope. Its main configuration is manufactured with a conductive material and includes two sets of a proof mass and two driver bodies suspended between two plates by an elastic beam assembly. Both surfaces of the driver bodies and the proof masses respectively include a number of grooves respectively perpendicular to a first axis and a second axis. The surfaces of the driver bodies and the proof masses and the corresponding stripe electrodes of the plates thereof are respectively formed a driving capacitors and a sensing capacitors. The driving capacitor drives the proof masses to vibrate in the opposite direction along the first axis. If a z-axial angular velocity input, a Coriolis force makes the two masses vibrate in the opposite direction along the second axis. If a first axial acceleration input, a specific force makes the two masses move in the same direction along the first axis. If a second axial acceleration input, a specific force makes the two masses move in the same direction along the second axis. Both inertial forces make the sensing capacitances change. One z-axial solid-state gyroscopes and two in-plane axial gyroscopes can be designed on a single chip to form a complete three-axis inertial measurement unit.

6 Claims, 9 Drawing Sheets

US 7,197,928 B2

SOLID-STATE GYROSCOPES AND PLANAR THREE-AXIS INERTIAL MEASUREMENT UNIT

This application is a Continuation-In-Part of application Ser. No. 10/699,868 filed on Nov. 4, 2003, now abandoned the entire contents of which are hereby incorporated by reference.

BACKGROUND OF THE INVENTION

1. Field of the Invention

The present invention relates to solid-state gyroscopes and a three-axis inertial measurement unit, which are in particular manufactured by a micro-mechanical technique, and can sense three axes angular velocities and three axes accelerations simultaneously.

2. The Related Art

The sensing axis of angular velocity for most of conventional gyroscopes manufactured by a micro-mechanical technique is parallel to the structure surface thereof. Furthermore, in case of needing to concurrently sense three axial angular velocities and accelerations, if the sensing axis of angular velocity is perpendicular to the structure surface thereof, the gyroscopes and accelerometers can be built on a single chip to measure three axial angular velocities and accelerations, and the cost and size thereof can be thus largely reduced. Therefore the other types of gyroscopes are born.

SUMMARY OF THE INVENTION

FIG. 1 shows a configuration of a conventional solid-state gyroscope, comprising two proof masses 3 and two comb drivers 31, 32 corresponding to each proof mass. Its sensing axis is perpendicular to the structure surface thereof. The proof masses 3 and the comb drivers 31, 32 are connected to an anchor 60 fixed on a substrate 71 by a number of elastic beams 6, 61, 62. The proof masses 3 have a number of regularly arranged holes 3h. The surface of the substrate 71 there under includes a number of pairs of stripe electrodes 91, 92 perpendicular to a sensing axis (y-axis) and respectively connected to bond pads 9p, 9n. The distance between corresponding points of the holes 3h along the y-axis is the same as that of the pairs of stripe electrodes 91, 92. The pairs of stripe electrodes 91, 92 and the surface of the proof mass 3 are formed two sensing capacitors c9p, c9n. The proof masses 3, comb drivers 31, 32 and elastic beams 6, 61, 62 may be formed from metal, doped silicon, silicon, or polysilicon. The lengths, widths and thickness of the elastic beams 6, 61, 62 are designed to facilitate the two axial compliances parallel to the structure surface thereof.

The two outer comb drivers 31 are respectively excited with a DC bias and an AC voltage at the mechanical resonant frequency thereof to cause the two proof masses 3 to vibrate in the opposite direction along the x-axis. The two inner comb drivers 32 are respectively excited with a DC bias and a high frequency AC voltage of opposite phase, and are mainly used to sense the driven amplitudes of the proof masses 3 and feedback the signals thereof for controlling the driven amplitudes. If a z-axial angular velocity input, a Coriolis force makes the two proof masses 3 vibrate in the opposite direction along the y-axis and causes a change in the capacitances of the sensing capacitors c9p, c9n. The sensing capacitors c9p, c9n are respectively excited with a DC bias and a high frequency AC voltage of opposite phase.

The current sensed from the output node GN is proportional to the differential displacement of the two proof masses 3.

There is another type of sensing capacitor, a comb capacitor (not shown in FIG. 1), being able to be used to sense the movements of the proof masses 3 along the y-axis. When the proof masses 3 move along the y-axis, the change in the distance of the capacitors results in the change in the capacitance thereof, which can be used to sense the displacements of the proof masses 3.

Although the second type of the conventional solid-state gyroscope can sense the angular velocity perpendicular to the structure surface thereof, it is more difficult to manufacture a practical electrostatic comb driver or a comb sensing capacitor. The reason is that they have two deep and spaced narrow vertical surfaces, the aspect ratio decreases with the increase in depth. The sensitivity thereof is also limited.

The improvements of the present invention comprise: the drivers and the sensors using a structure of stripe capacitors with an edge effect; the manufacturing process being simple; no need to manufacture two deep and spaced narrow vertical surfaces; no special manufacturing process requirement of high aspect ratio; and suitable for multiple fabrication techniques.

In summary, the present invention discloses: (1) a z-axial solid-state gyroscope being able to sense an angular velocity perpendicular to the structure surface thereof and to sense two axes acceleration parallel to the structure surface thereof; (2) a solid-state gyroscope being able to sense an angular velocity parallel to the structure surface and to sense an axial acceleration perpendicular to the structure surface thereof and to sense an axial acceleration parallel to the structure surface thereof; (3) one or two z-axial solid-state gyroscopes and two solid-state gyroscopes with sensing axes parallel to the structure surface thereof being designed on a single chip to form a functionally complete planar inertial measurement unit that can be concurrently manufactured in one manufacturing process, and the size and the manufacturing and assembling cost thereof can be largely reduced.

BRIEF DESCRIPTION OF THE DRAWINGS

The objects, effectiveness and configurations of the present invention will be more definitely understood after reading the detailed description of the preferred embodiment thereof with reference to the accompanying drawings.

FIG. 2 is a schematic view of a configuration of a z-axial solid-state gyroscope in accordance with a preferred embodiment of the present invention, in which

FIG. 6 is a schematic view of a configuration of an x-axial solid-state gyroscope, the sensing axis thereof parallel to the structure surface thereof, in accordance with a preferred embodiment of the present invention, in which

6b shows a schematic view of electrodes of driving capacitors and sensing capacitors on a surface of a glass plate.

Figure 7A:
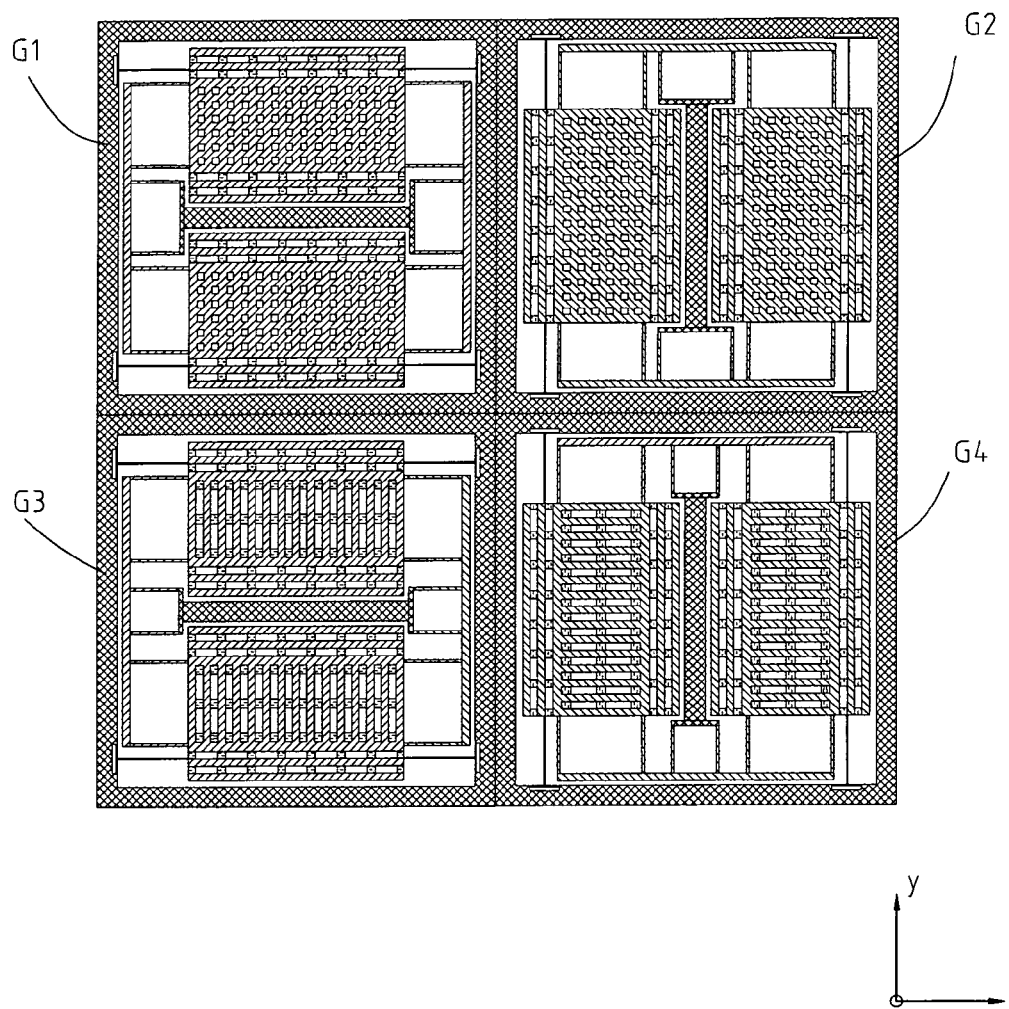
Figure 7B:
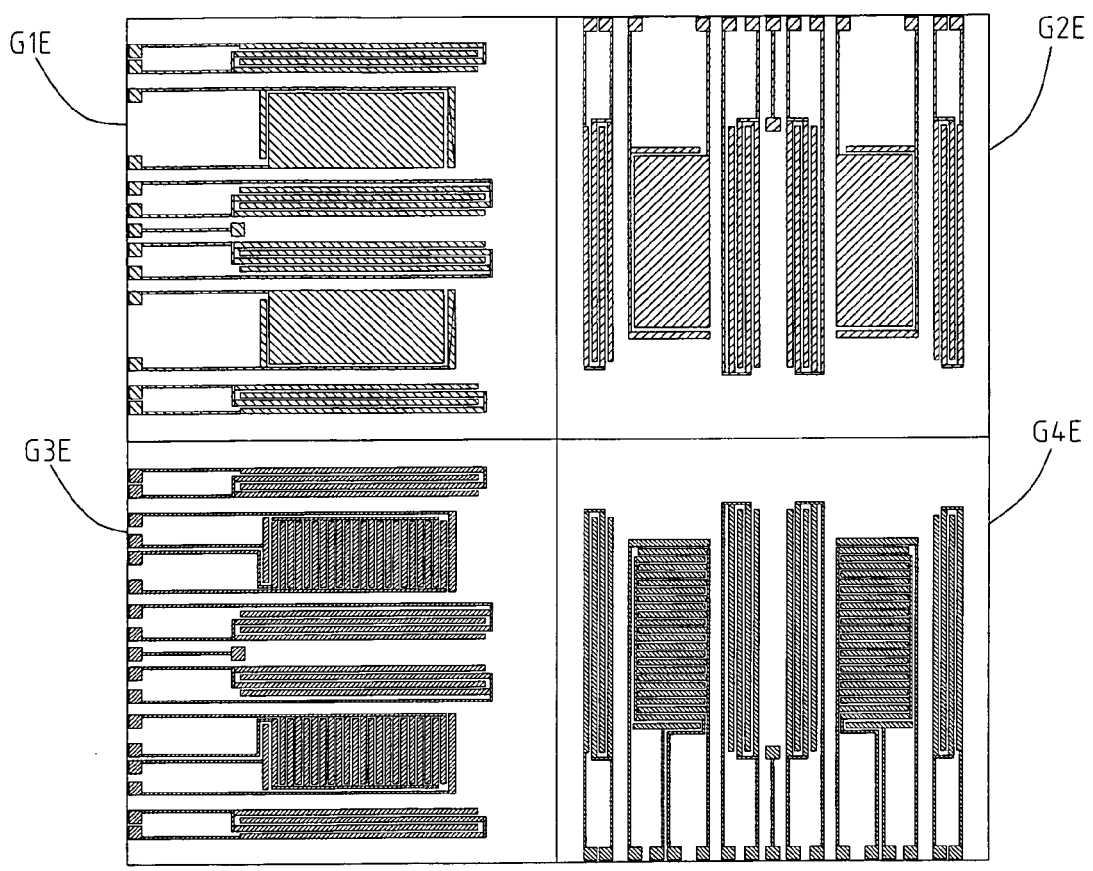

FIG. 7 is a schematic view of a configuration of a planar three-axis inertial measurement unit constructed by four solid-state gyroscopes in which FIG. 7a shows a top view of the main configuration thereof and FIG. 7b shows a schematic view of electrodes of driving capacitors and sensing capacitors on a surface of a glass plate.

DETAILED DESCRIPTION OF THE PREFERRED EMBODIMENT

Figure 1:
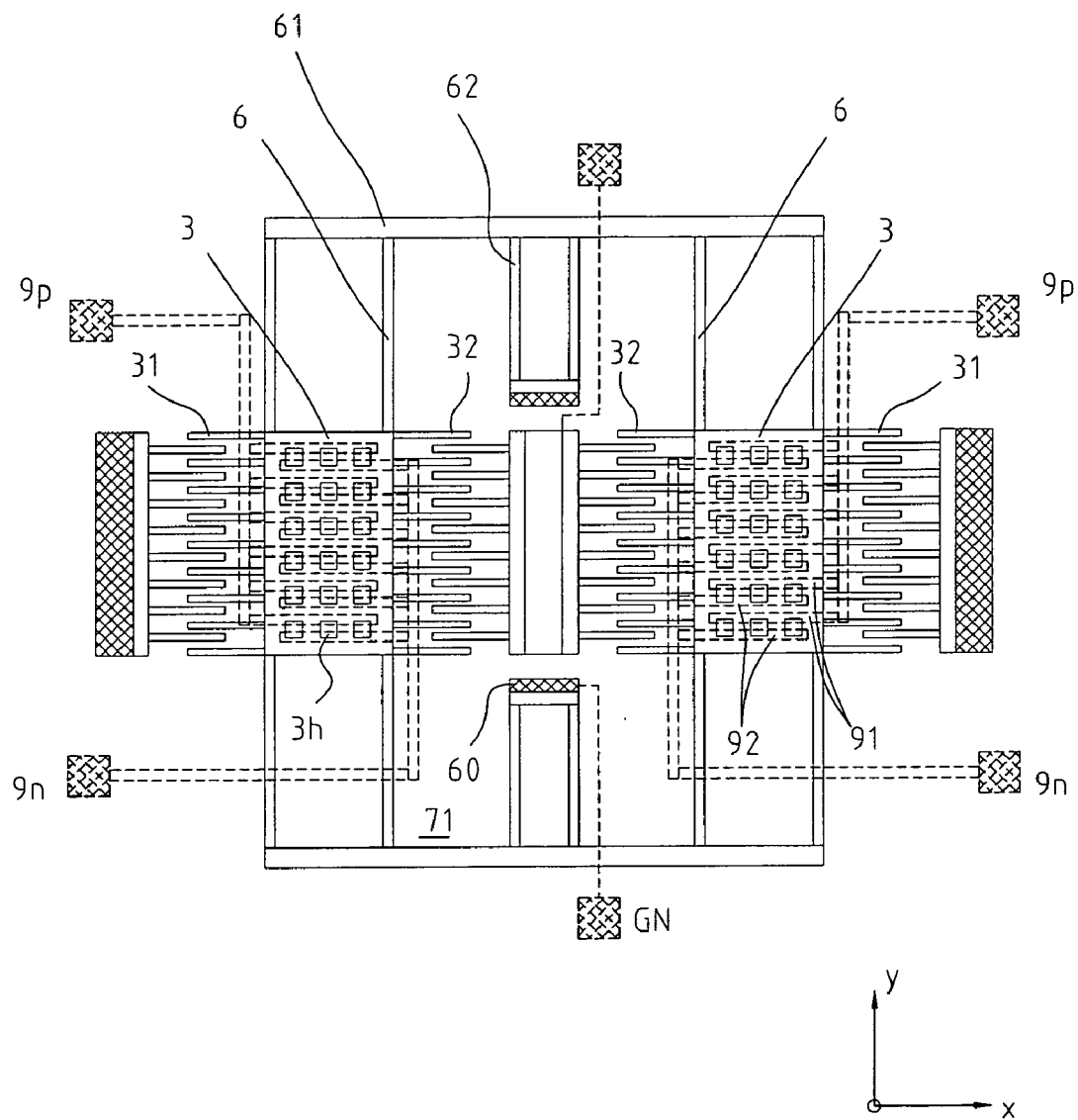
FIG. 1 is a schematic view of a configuration of a conventional solid-state gyroscope, which can sense an angular velocity perpendicular to the structure surface thereof.
Figure 2A:
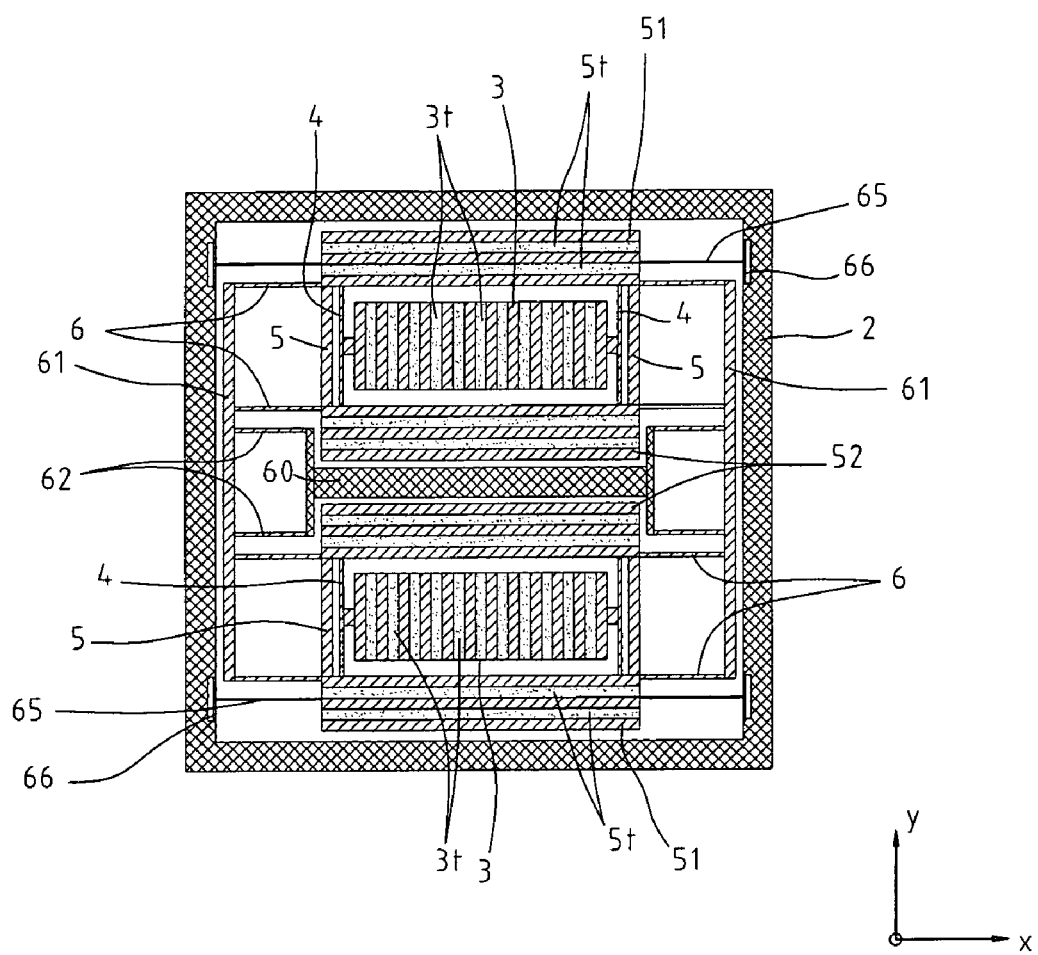
FIG. 2a shows a top view of the main configuration thereof and FIG. 2b shows a schematic view of stripe electrodes of driving capacitors and sensing capacitors on a surface of a glass plate, and a simplified electronically function block diagram.

Referring to FIG. 2a, which shows a schematic view of a configuration of a z-axial solid-state gyroscope of a preferred embodiment in accordance with the present invention, the configuration is manufactured with a conductive material and comprises an outer frame 2 and a central anchor 60. The interior of the outer frame 2 has two sets of a proof mass 3 and two driver bodies 51, 52. Each proof mass 3 is respectively connected to the corresponding two driver bodies 51, 52 thereof by at least one sensing elastic beam 4. Two connection beams 5 connect the two driver bodies 51, 52 to each other. Each proof mass 3 and the corresponding driver bodies 51, 52 thereof are respectively connected to a common connection beams 61 by a number of driving elastic beams 6. The common connection beams 61 are connected to a common elastic beams 62 fixed at the central anchor 60. Each proof mass 3 and the corresponding driver bodies 51, 52 thereof are also additionally suspended to the outer frame 2 by a number of elastic beams 65, 66.

Two glass plates 71, 72 are respectively positioned in front and rear of the main configuration thereof and mounted with the outer frame 2 and the anchor 60 together, so that the other elements are suspended between the two glass plates 71, 72. The sensing beams 4 make the proof masses 3 facilitate move along a specially designated direction (defined as x-axis) parallel to the surfaces of the glass plates 71, 72. The driving elastic beams 6, the common elastic beams 62, and the elastic beams 65, 66 make the proof masses 3 and the driver bodies 51, 52 facilitate move along another specially designated direction (defined as y-axis) parallel to the surfaces of the glass plates 71, 72. Both surfaces of the proof masses 3 respectively have a number of grooves 3t perpendicular to the x-axis. Both surfaces of the driver bodies 51, 52 respectively have a number of grooves 5t perpendicular to the y-axis.

Figure 2B:
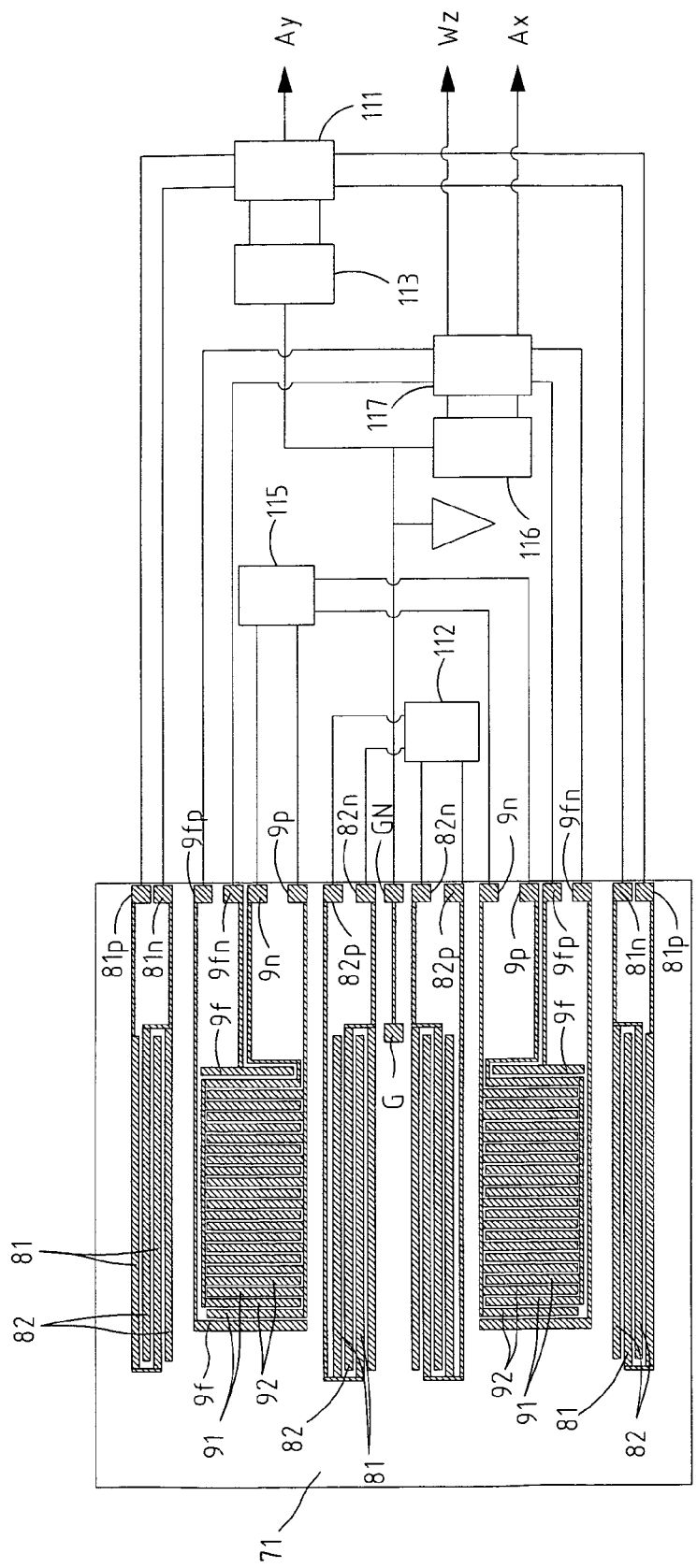
Figure 3:
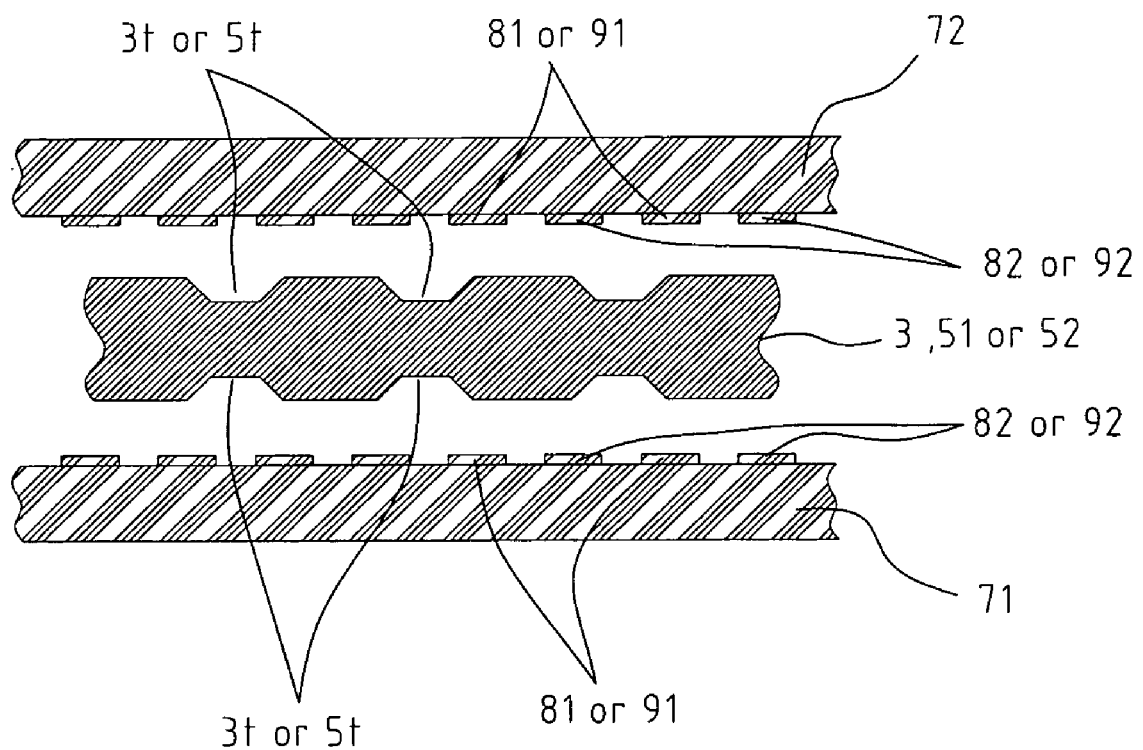
FIG. 3 is a cross-sectional schematic view of a configuration of the stripe electrodes of the driving capacitor and the sensing capacitor.

The surface of each glass plate facing the silicon chip and corresponding to each driver body 51 includes two sets of interposed stripe electrodes 81, 82 parallel to the grooves 5t, which are respectively connected to a bond pads 81p, 81n (see FIG. 2b). The relative positions of the grooves 5t on the surface of the driver bodies 51 and the corresponding stripe electrodes 81, 82 thereof are shown in FIG. 3. Each surface of each driver body 51 and the corresponding stripe electrodes 81, 82 thereof respectively are formed two sets of driving capacitors c81p, c81n. In similar, the surface of each glass plate facing the silicon chip and corresponding to each driver body 52 include another two sets of interposed stripe electrodes 81, 82 parallel to the grooves 5t, which are respectively connected to a bond pads 82p, 82n. Another two sets of driving capacitors c82p, c82n are formed.

The surface of each glass plate facing the silicon chip and corresponding to the grooves 3t on the surface of each proof mass 3 thereof also include two sets of interposed stripe electrodes 91, 92 parallel to the grooves 3t, which are respectively connected to a bond pads 9p, 9n. Each surface of each proof mass 3 and the corresponding stripe electrodes 91, 92 thereof are formed two sets of sensing capacitors c9p, c9n.

The outer driving capacitors c81p, c81n are respectively excited with a DC bias and an AC voltage of opposite phase at the mechanical resonant frequency with a means 111 thereof to cause the two proof masses 3 to vibrate in the opposite direction along the y-axis. If a y-axial acceleration input, a specific force makes the two sets of a proof mass 3 and two driver bodies 51, 52 move in same direction along the y-axis. Both driving force and specific force make the areas of the stripe capacitors change and thus make the capacitances of the driving capacitors c82p, c82n change.

The inner driving capacitors c82p, c82n are respectively excited with a high frequency AC voltage of opposite phase with a means 112 thereof, and are used to sense the driven amplitude of the proof masses 3 and the y-axis acceleration. The signals from the output node GN induced by the driving force and the y-axis specific force is respectively an AC signal and a low frequency or DC signal, which can be separated into a driven amplitude and a y-axial acceleration signal Ay by a signal processing means 113 and can be feed backed to capacitors c81p, c81n with the means 111 for controlling the driven amplitude and for rebalancing of the y-axis specific force.

If a z-axial angular velocity input, a Coriolis force makes the two proof masses 3 vibrate in the opposite direction along the x-axis. If an x-axial acceleration input, a specific force makes the two proof masses 3 move in same direction along the x-axis. Both inertial forces make the areas of the stripe capacitors change and thus make the capacitances of the sensing capacitors c9p, c9n change.

The sensing capacitors c9p, c9n are respectively excited with a high frequency AC voltage of opposite phase with a means 115. The signals induced by an angular velocity and an x-axial acceleration is respectively an AC signal and a low frequency or DC signal, which can be separated into a z-axial angular velocity Wz and an x-axial acceleration signal Ax by a signal processing means 116. A part of the stripe electrodes 91, 92 of the sensing capacitors c9p, c9n can be isolated as a feedback electrode 9f to form two sets of feedback capacitors c9fp, c9fn for the rebalancing of the Coriolis force and the x-axis specific force. The signals of the Coriolis force of the proof mass 3 and the x-axial acceleration signal Ax been fed to a feedback control means 117 to generate a feedback signal then feed backed to the feedback capacitors c9fp, c9fn to rebalance of the Coriolis force and the x-axis specific force.

Figure 4:
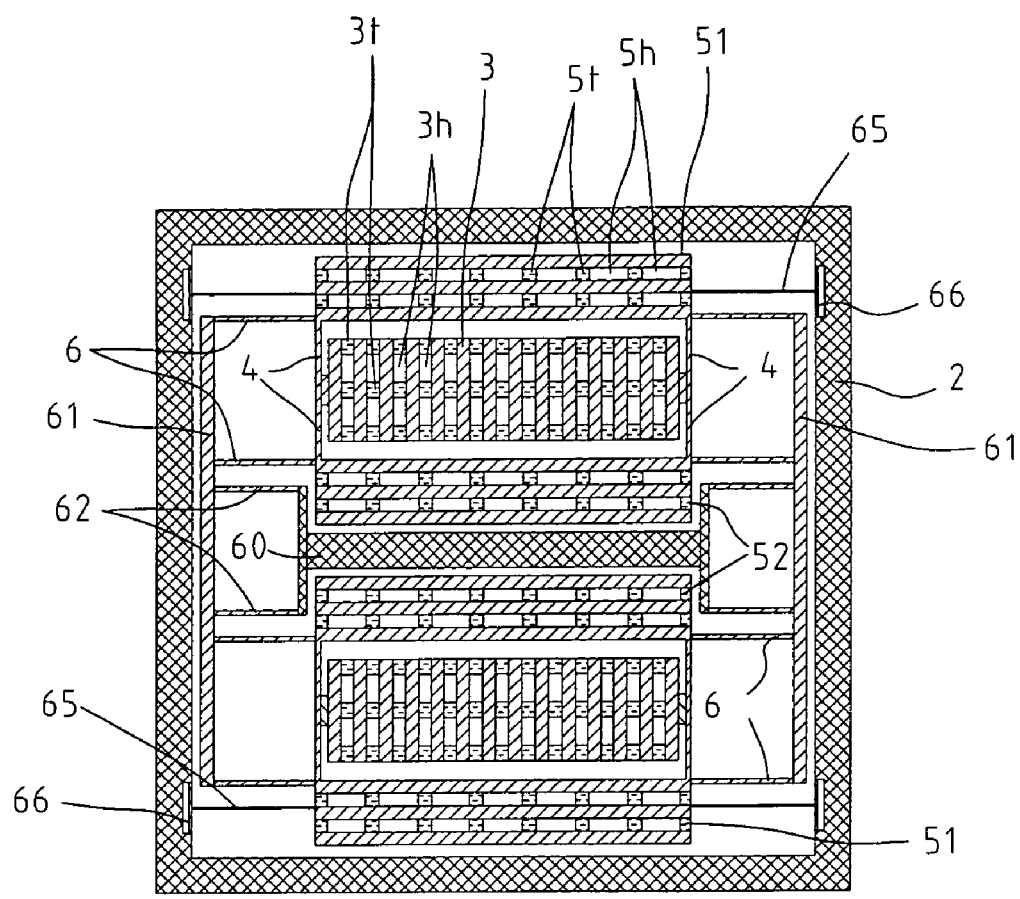
FIGS. 4 and 5 are schematic views of the configurations of the z-axial solid-state gyroscopes in accordance with another two preferred embodiments of the present invention.
Figure 5:
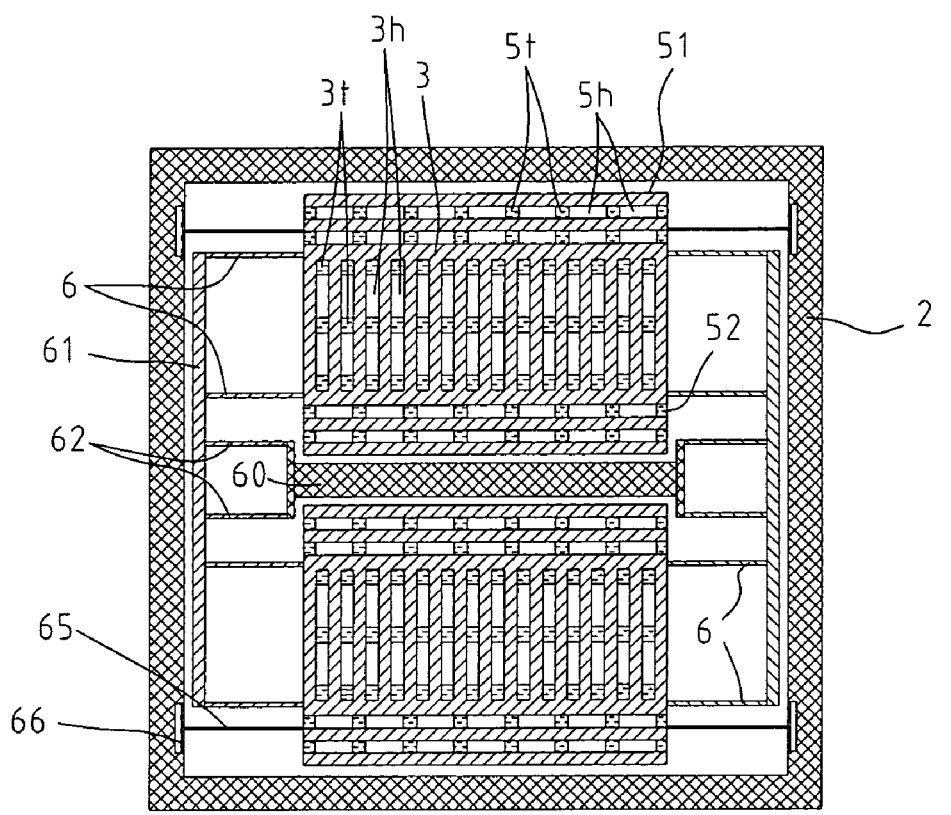

There are many different types of the structure shown in FIGS. 4 and 5. The grooves 3t, 5t on the surfaces of the proof masses 3 and the driver bodies 51, 52 are further etched a plurality of deep holes or through holes 3h, 5h to lessen the burden of the drivers and thus promote the driving performance thereof. In addition, as shown in FIG. 4, the connection beams 5 are deleted but the sensing beams 4 still connect to the two driver bodies 51, 52. Referring to FIG. 5, the sensing beams 4 and the connection beams 5 are deleted, the proof masses 3 and the two driver bodies 51, 52 are directly connected together, the roles of the sensing beams 4 are instead of the common connection beams 61.

The configuration of the present invention can be manufactured by dissolved wafer process, surface micromachining, dry etching, LIGA, and bulk micromachining etc. There has no need to fabricate two deep and spaced narrow vertical surfaces same as those of a conventional comb structure, i.e., no special manufacturing process requirement of high aspect ratio.

The above z-axial solid-state gyroscope and two in-plane axial gyroscopes can be designed on a single chip to form a functionally complete planar inertial measurement unit having functions of three-axial gyroscopes and three-axial accelerometers.

Figure 6A:
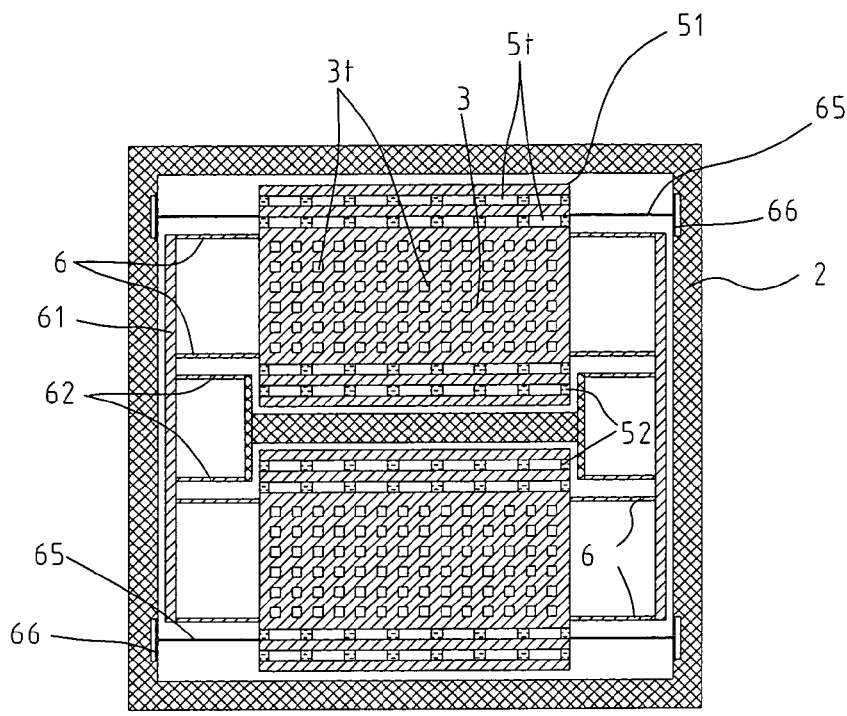
FIG. 6a shows a top view of the main configuration thereof and FIG.
Figure 6B:
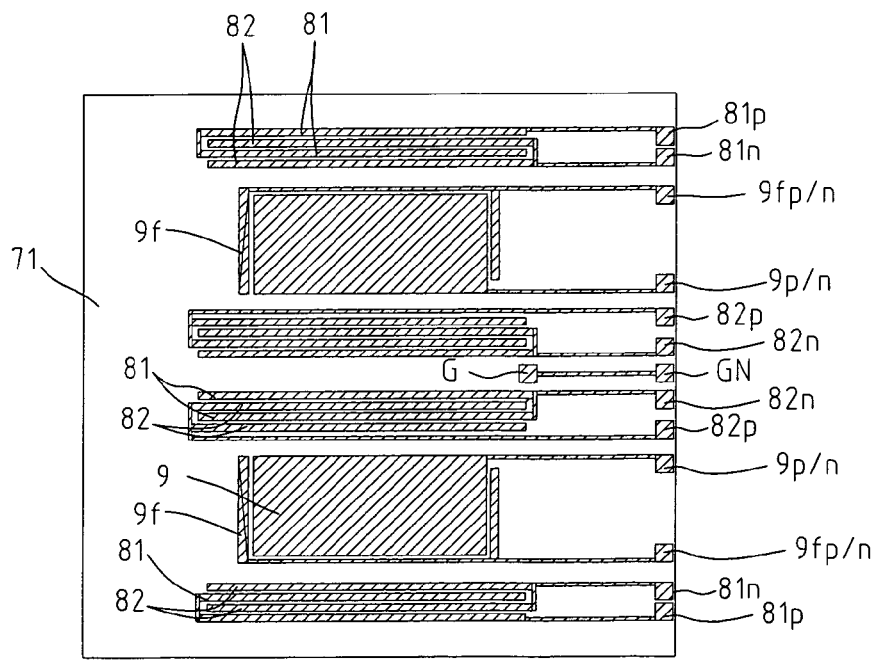

FIG. 6 shows a schematic view of an x-axial solid-state gyroscope in accordance with the present invention, the sensing axis thereof being parallel to its structure surface. FIG. 6a is a top view of the configuration thereof. FIG. 6b shows a schematic view of interposed stripe electrodes 81, 82 of the driving capacitors and electrodes 9 of the sensing capacitors on the surface of a glass plate 71. The configuration of the x-axial solid-state gyroscope in FIG. 6 is substantially same as that of the z-axial solid-state gyroscope in FIG. 5. The major differences between both gyroscopes are: (1) the sensing beams 6 of the x-axial solid-state gyroscope making the proof masses 3 facilitate move along the z-axis, but along the x-axis for the z-axial solid-state gyroscope in FIG. 5; and (2) each sensing electrode on each glass plate corresponding to each proof mass 3 for the x-axial solid-state gyroscope being a single electrode 9, but two sets of interposed stripe electrodes 91, 92 for the z-axial solid-state gyroscope.

In order to assemble a planar three-axis inertial measurement unit, a y-axis solid-state gyroscope is required except the above x-axial and z-axial gyroscopes. The configuration of the y-axis solid-state gyroscope is the same as the x-axial solid-state gyroscope but rotates an angle about the z-axis.

Three solid-state gyroscopes (G1, G2, G3) are assembled to form a planar three-axis inertial measurement unit. Axial arrangements of the driving axis, the sensing axis, the angular velocity input axis, and the acceleration input axis for various gyroscopes are summarized in Table 1.

TABLE 1

Axial arrangements of various gyroscopes for a planar three-axis inertial measurement unit.

| Gyroscope No. | Driving axis | Sensing axis | Angular velocity input axis | Acceleration input axis |
|---|---|---|---|---|
| G1 | Dy | Dz | Wx | Az, Ay |
| G2 | Dx | Dz | Wy | Az, Ax |
| G3 | Dy | Dx | Wz | Ax, Ay |
| G4 | Dx | Dy | Wz | Ay, Ax |

From Table 1, there are two sets of output signals of each axial acceleration, that is, there is redundancy property for each axial acceleration detection in the present invention. If a specific axial angular rate detection needs redundancy property, we can add a fourth gyroscope corresponding to the specific axial, for example, if we need z-axial angular rate detection possess redundancy, we can add a second z-axial gyroscope, as shown in table 1.

FIG. 7 shows a schematic view of a planar three-axis inertial measurement unit constructed by four solid-state gyroscopes (G1, G2, G3, G4) in accordance with the present invention, in which FIG. 7a shows a top view of the main configuration thereof, wherein the axial arrangements of the driving axis, the sensing axis, the angular velocity input axis and the acceleration input axes for various gyroscopes is the same as that listed in Table 1, and FIG. 7b shows a schematic view of four sets of electrodes of driving capacitors and sensing capacitors (G1E, G2E, G3E, G4E) on a surface of a glass plate, corresponding to the four gyroscopes (G1, G2, G3, G4), respectively.

The above description is only for illustrating the preferred embodiments of the present invention, and not for giving any limitation to the scope of the present invention. It will be apparent to those skilled in this art that all equivalent modifications and changes shall fall within the scope of the appended claims and are intended to form part of this invention.

What is claimed is:

1. A z-axial solid-state gyroscope, manufactured by a conductive material and comprising: two sets of a proof mass and a corresponding two driver bodies suspended between two parallel plates by an elastic beam assembly so that they can move along a first axis and a second axis parallel to a surface of the plates; the z-axial solid-state gyroscope sensing an angular velocity about a z-axis perpendicular to the surface of the plates and a first-axial acceleration and a second-axial acceleration;

a front and a back surfaces of each driver body forming a plurality of grooves perpendicular to the first axis, a surface of each plate facing to each driver body being formed of two sets of driving electrodes, respectively including a number of stripe electrodes perpendicular to the first axis, the two sets of driving stripe electrodes being interposed with each other to form two sets of driving capacitors with a corresponding surface of the driver body;

a front and a back surfaces of each proof mass forming a plurality of grooves perpendicular to the second axis, a surface of each plate facing to the proof mass being formed of two sets of sensing electrodes, respectively including a number of stripe electrodes parallel to the grooves of the proof mass, the two sets of sensing stripe electrodes being interposed with each other to form two sets of sensing capacitors with a corresponding surface of the proof mass; the capacitances thereof changing with the movement of the proof masses along the second axis;

the driving capacitors of the two driver bodies corresponding to each proof mass are divided into two parts;

the first part of the driving capacitors being excited with a DC bias and an AC voltage at the mechanical resonant frequency with proper phases to drive the two proof masses to vibrate in opposite direction to each other along the first axis; and the second part of the driving capacitors being excited with a high frequency AC voltage to sense a vibration amplitude in the opposite direction to each other and a displacement in the same direction of the two proof masses along the first axis, and feedback them to the first part of the driving capacitors to control the vibration amplitude of the two proof masses and to rebalance a specific force along the first axis;

the sensing capacitors been excited with a high frequency AC voltage to sense a vibration amplitude signal in the opposite direction and an displacement in the same direction of the two proof masses along the second axis; and output signals of each proof mass induced by an angular velocity and an acceleration are respectively a AC signal and a DC signal, which are separated into an angular velocity signal and an acceleration signal by a signal processing means.

2. The z-axial solid-state gyroscope as claimed in claim 1, wherein the elastic beam assembly comprises:

a number of connection beams, connecting the two driver bodies corresponding to each proof mass;

a number of sensing beams, connecting each proof mass to the corresponding two driver bodies thereof and making the proof masses be able to move along the second axis;

two common connection beams, positioned at two sides of the proof masses;

a number of first elastic beams, connecting the proof masses and the driver bodies to the common connection beams; and a number of second elastic beams, connecting the common connection beams to a central anchor fixed at the two plates.

3. The z-axial solid-state gyroscope as claimed in claim 1, wherein the elastic beam assembly comprises:

a number of sensing beams, connecting each proof mass to the corresponding two driver bodies thereof and making the proof mass be able to move along the second axis;

two common connection beams, positioned at two sides of the proof masses;

a number of first elastic beams, connecting the proof masses and the driver bodies to the common connection beams; and a number of second elastic beams, connecting the common connection beams to a central anchor fixed at the two plates.

4. The z-axial solid-state gyroscope as claimed in claim 2, wherein the elastic beam assembly further comprises a number of third and fourth elastic beams connecting the proof masses and the driver bodies to an outer frame fixed at the two plates.

5. The z-axial solid-state gyroscope as claimed in claim 3, wherein the elastic beam assembly further comprises a number of third and fourth elastic beams connecting the proof masses and the driver bodies to an outer frame fixed at the two plates.

6. The z-axial solid-state gyroscope as claimed in claim 1, wherein each sensing capacitor is partitioned into two parts:

the first part of the sensing capacitors being excited with a high frequency AC voltage to sense an angular velocity signal perpendicular to the surface of the plates and an acceleration signal along the second axis; and the second part of the sensing capacitors generating a feedback signal with a feedback control means to rebalance the vibration of the proof masses due to a Coriolis force and a specific force, along the second axis.

* * * * *